United States Patent [19]

Spotts et al.

[11] Patent Number: 4,977,488
[45] Date of Patent: Dec. 11, 1990

[54] SOLAR POWERED OUTDOOR RECREATIONAL LIGHT WITH POSITIONABLE SOLAR PANEL

[75] Inventors: James C. Spotts, Kowloon; Haw R. Chai, Hong Kong, both of Hong Kong

[73] Assignee: Australux North America Ltd., Kowloon, Hong Kong

[21] Appl. No.: 493,216

[22] Filed: Mar. 14, 1990

[51] Int. Cl.⁵ .............................................. F21L 11/00
[52] U.S. Cl. .................................. 362/183; 362/157; 403/90; 403/115
[58] Field of Search .................. 403/90, 114, 115, 134; 362/157, 183

[56] References Cited

U.S. PATENT DOCUMENTS

| 1,333,432 | 3/1920 | Maier | 403/90 |
| 4,281,369 | 7/1981 | Batte | 362/183 |
| 4,444,466 | 4/1984 | Deshaw | 403/90 |
| 4,486,820 | 12/1984 | Baba et al. | 362/395 |

Primary Examiner—Carroll B. Dority
Attorney, Agent, or Firm—Wallenstein, Wagner & Hattis

[57] ABSTRACT

A solar powered outdoor recreational light 10 comprising a housing 14, a lamp operatively associated with the housing 14, a solar panel 12 and a joint 20 coupling the solar panel 12 and housing 14 in articulatable relation to each other. The joint 20 is substantially at the center of gravity and rotation of the solar panel 12. The joint 20 includes a pin 28 and pin seat 30 which are cooperable with a sphere 26 and sphere seat 24b.

9 Claims, 2 Drawing Sheets

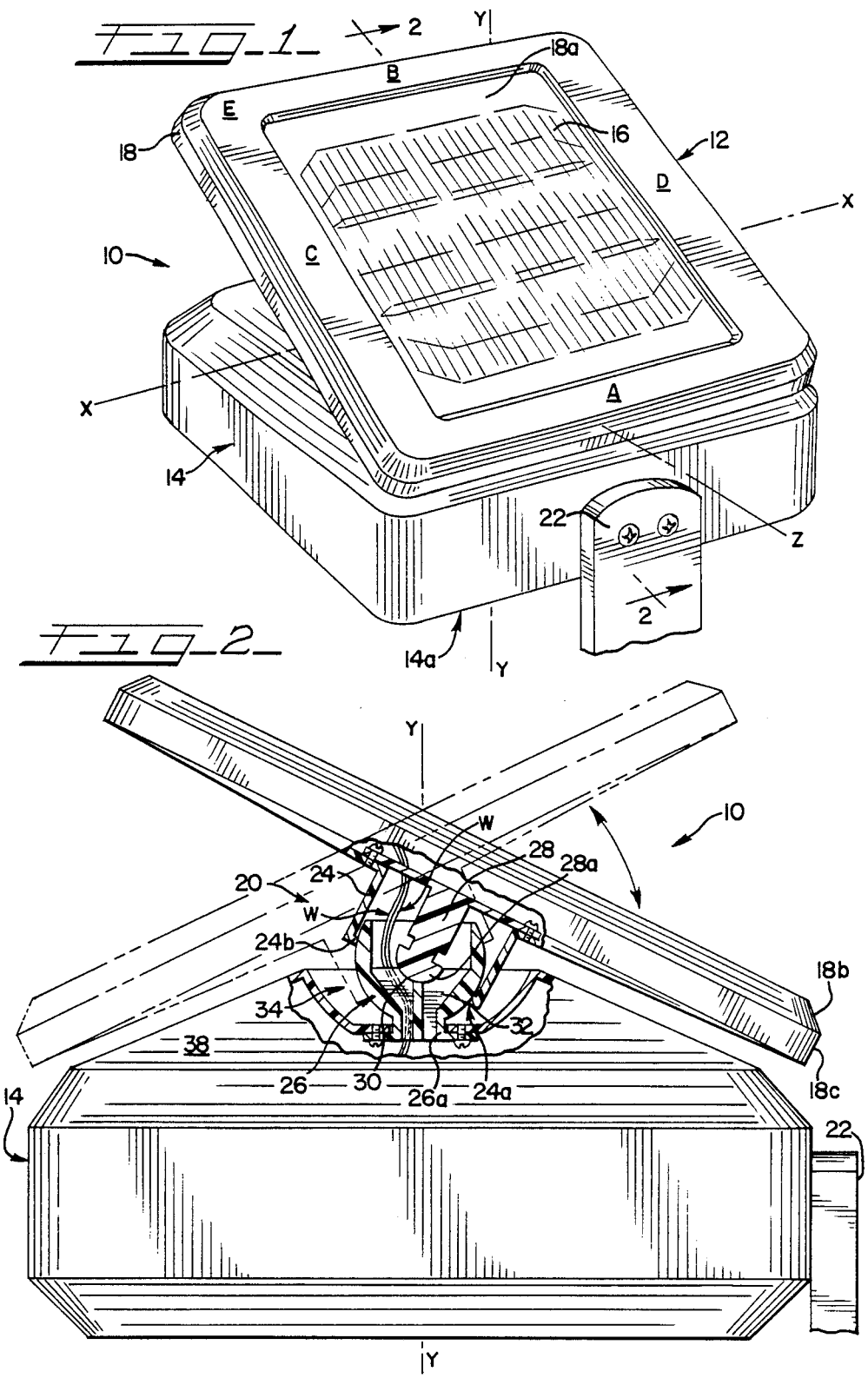

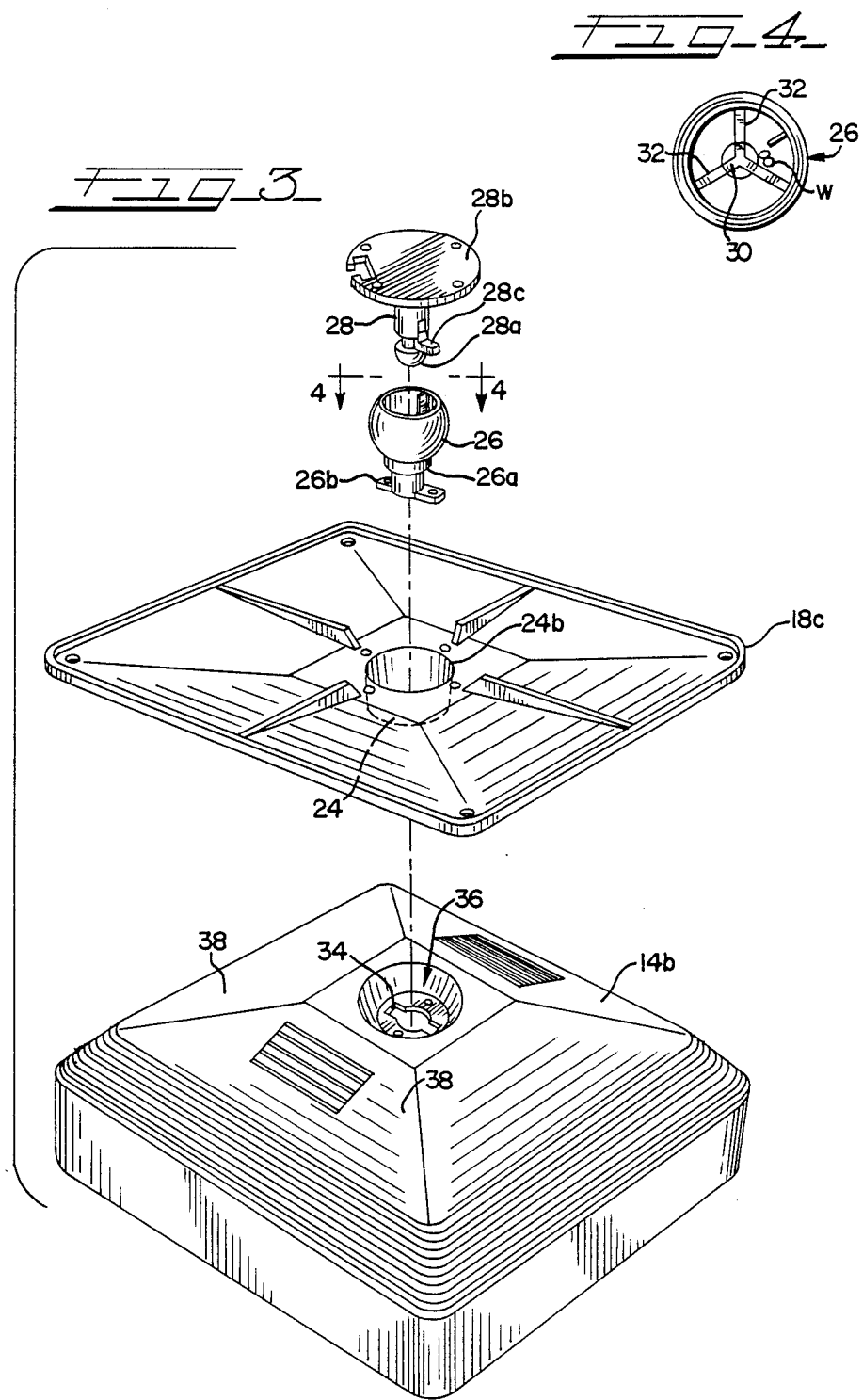

SOLAR POWERED OUTDOOR RECREATIONAL LIGHT WITH POSITIONABLE SOLAR PANEL

DESCRIPTION

1. Technical Field

The invention relates generally to solar powered lights for outdoor recreational use and particularly to such lights having a solar collector which is manually repositionable to align the solar collector with the changing angle of the sun.

2. Background of the Invention

In recent years, solar powered lighting has become popular for lighting outdoor recreational areas and other remote locations around the home such as sidewalks, patios and pool areas. Solar powered lights for the home consumer market are necessarily limited in size and expense. Particularly, the solar panel incorporated in such a device must be reasonably limited in size because; (1) solar collecting material is expensive; (2) a large solar panel can detract from the aesthetic appearance of both the light and the area the light is used in; and, (3) a large solar panel can be cumbersome when used in an area with limited perimeter space such as a patio or pool area.

Typically, a solar panel includes a solar array which converts solar energy to charge a storage battery during daylight. The battery then powers a lamp for use in darkness. Due to the size and cost limitations discussed above, the performance of conventional solar powered lights is limited and frequently inadequate.

An attempt to overcome the above-mentioned deficiencies in a solar powered light is suggested in U.S. Pat. No. 4,486,820 to Yasushi Baba, et al. ("the Baba patent"). FIG. 2 of the Baba patent discloses a generally flat solar cell 2 which is rotatively supported on poles 13a and 13b at point 16. The solar cell 2 is attached to the poles 13a and 13b at an edge of the solar cell 2. FIG. 2 suggests that in this configuration, the solar cell 2 is attached by an articulatable joint (see arrows). This permits the solar cell 2 to be rotated about an X axis and about a Y axis to reposition the solar cell. Repositioning of the solar cell 2 to face the sun as it changes position during a day and from season to season permits optimization of the total light available for energy transformation, thereby, improving the performance of the light.

Significant disadvantages result from the structure disclosed and suggested by the Baba patent. The placement of a rotatable connection at the edge of the solar cell 2 presents a cantilevered relation between the solar cell 2 and its support poles 13a and 13b. This cantilevered relationship produces a moment about the articulatable joint. The moment created by this configuration must be compensated for by an appropriate increase in the size and stiffness of the joint. Alternatively, the joint must include means to unlock the joint when movement is desired and to lock it again once the solar cell 2 is repositioned.

Another problem is presented by the configuration disclosed in the Baba patent. In order to track the sun from sunrise to sunset, the solar cell 2 must be inconveniently moved in one of the following ways when moving the solar cell 2 from facing east to facing west. First, the solar cell 2 must be rotated about a Y axis to change direction from east to west. Then the solar cell must be rotated about an X axis (or Z axis as desired) to obtain the appropriate angle. Of course these movements require the user to overcome both the force presented by the stiff joint and the moment presented by the solar cell 2. In addition, the change might require unlocking and relocking the joint before and after the movement (depending on the stiffness of the joint). As an alternate method of changing the position of the solar cell 2, the solar cell 2 could be rotated solely about an X axis (e.g. FIG. 2 point 16 of poles 13a and 13b). An effective rotation in this manner requires that the solar cell 2 rotate from a position above its joint to a position below its joint. The diameter of such a rotation is twice the length of the solar cell 2. This, of course, necessitates that the support for the solar cell be spaced inconveniently far above the other protruding components of the solar powered light such as the lamp and battery housings 14 and 15 of FIG. 2 so that the path of rotation is unobstructed.

The present invention overcomes the deficiencies just described and provides further improved structure in a solar powered light.

SUMMARY OF THE INVENTION

A solar powered light includes a solar panel and a lower housing including a lamp. The solar panel comprises an array of solar collecting (photo voltaic) material associated with an upper housing. The solar panel and lower housing are coupled in articulatable relation to each other by a joint. The joint is attached to the solar panel substantially at the center of gravity and the center of rotation of the solar panel.

In this configuration, very little to no moment is presented at the joint by the solar panel. This permits the joint to be non-stiff for easy repositioning of the solar panel. Also, because no moment is presented, the solar panel will remain in any position in which it is placed without means for locking the joint. Further, in accordance with this structure, the solar panel is capable of compound rotation. For example, the solar panel can be rotated about an X or Z axis to track the sun from east to west (sunrise to sunset) without any rotation about the Y axis. Similarly, the solar panel can be changed from rotational movement in the X axis to rotational movement in the Z axis without any movement about the Y axis. The solar panel can also be repositioned to assume an orientation in an X-Y-Z plane (such as may be needed in the northern hemisphere to track the sun from east to west) with one discrete compound rotation (ie. without separate X, Y, and Z axis rotations). Finally, the upper housing can be rotated about the Y axis if so desired.

To position the solar panel toward the sun, the user need only push relatively gently downward on an edge of the solar panel which faces the sun. This one discrete motion will tilt the solar panel toward the sun.

As discussed above, the structure of the present invention presents no moment at the joint. Therefore, the force required to reposition the solar panel need not overcome any moment and need only surpass inertia in the solar panel and friction in the joint. (As already noted, the joint need not be stiff, i.e. low friction).

The unique structure of the joint of the present invention additionally provides very low friction which further reduces the amount of force required to reposition the solar panel.

The joint comprises, a cooperable sphere and sphere seat interposed between the solar panel and the lower housing at the center of gravity of the solar panel. A cooperable pin and pin seat are also interposed between the solar panel and the lower housing. The pin and pin seat are located within and are cooperable with the sphere and sphere seat. The sphere and sphere seat maintain the pin in the pin seat and the pin and pin seat maintain the sphere in the sphere seat. In this configuration, rotation of the upper housing in the X or Z axis is accomplished by a rocking motion about the pin seat. The engaged surface area in the pin and pin seat can be made very small and thus greatly reduce friction in the joint during repositioning of the solar panel.

Other advantages and aspects of the invention will become apparent upon making reference to the specification, claims, and drawings to follow. For example, as discussed in more detail below, the structure of the joint also provides for easier manufacture than conventional ball-in-socket joints and has better aesthetic and sealing properties.

BRIEF DESCRIPTION OF THE DRAWINGS

FIG. 1 is a perspective view of the solar powered outdoor recreational light of the present invention;

FIG. 2 is a side view of the light of FIG. 1 with a solar panel thereof shown in solid and ghost to depict movement of the solar panel; a partial cross section of a joint thereof taken along line 2—2 of FIG. 1 is also shown;

FIG. 3 is an exploded view of the light; and,

FIG. 4 is a cross sectional view of a sphere of the joint taken along line 4—4 of FIG. 3.

DETAILED DESCRIPTION OF THE INVENTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

FIG. 1 discloses a solar powered light 10 for outdoor recreational area use in accordance with the invention. Generally, the light 10 includes a solar panel 12 coupled in articulatable relation to a lower housing 14 by a joint 20. As best seen in FIGS. 2 and 3, the joint 20 is located substantially at the center of gravity and the center of rotation of the solar panel 12.

The solar panel 12 includes a solar array 16 housed in housing 18. Preferably housing 18 is generally flat and includes a transparent window 18a to allow sunlight to reach the solar array 16.

Lower housing 14 houses a lamp (not shown) whose illumination is directed through a window on a bottom surface 14a of the housing 14. The housing 14 also houses a battery (not shown) which is recharged by the solar array 16 during daylight hours and used to power the lamp during hours of darkness. It will be noted that housing 14 also includes appropriate circuitry to permit proper operation of electrical components of the solared powered light as is known in the art.

The light 10 is supported above a support surface, such as the ground, by a post 22 which is affixed to a side of the housing 14.

As disclosed in FIG. 2, joint 20 includes a sleeve 24, a generally hollow sphere 26, a pin 28, and a pin seat 30. The sleeve 24 extends from the solar panel 12 and terminates with an opening 24a. Sphere 26 extends from lower housing 14 into opening 24a of sleeve 24. The inner diameter of opening 24a is dimensioned to be smaller than an outer diameter of sphere 26. This can be accomplished by providing that sleeve 24 tapers from the solar panel 12 to the opening 24a. However, in a preferred embodiment, an inwardly turned peripheral lip 24b in the opening 24a may be provided as disclosed in FIG. 2.

In this configuration, lip 24b serves as a seat for the sphere 26. Sphere 26 is free to rotate within the sleeve 24 but cannot be withdrawn from it and a portion of the sphere 26 will extend beyond the sleeve for attachment to the lower housing 14. Although the sphere could be attached directly to the lower housing 14, in the preferred embodiment disclosed herein, a pedestal 26a extends from a lower exposed portion of the sphere 26 to the lower housing 14 for attachment thereto.

Pin 28 extends from solar panel 12 within sleeve 24. Pin 28 terminates in a generally rounded pin end 28a. The pin end 28a is cooperable with pin seat 30 which is within the generally hollow sphere 26.

As best disclosed in FIGS. 2 and 4, pin seat 30 is supported on three radially spaced ribs 32 within the sphere 26. Preferably, the pin seat 30 is formed by a portion of each rib 32 being arcuately recessed proximate to an intersection of the ribs 32.

As shown in FIGS. 1 and 2, the solar panel 12 is rotatable about an X or Z axis (lines X—X and Z—Z of FIG. 1). The X and Z axes intersect at the pin seat 30. Rotation of solar panel 12 about these axes defines a rocking motion of the solar panel 12 on the pin 28 over the pin seat 30. To position the solar panel 12, a user need only push relatively gently on an edge of the solar panel 12. For example, to reposition the solar panel 12 from the position disclosed in FIGS. 1 and 2 to a position as shown in ghost in FIG. 2, a user would push on the solar panel 12 near edge surface B of FIG. 1. This would cause a rotation of the solar panel 12 about the X axis (line X—X of FIG. 1). Thus, tracking of the sun from sunrise to sunset can be done by sequentially pushing either A then B (morning to night) or C then D, depending on the orientation of the light 10 with respect to the sun's travel.

A combination (X and Z rotation) can be achieved by pressing on a corner edge surface such as E of FIG. 1. This permits, with one motion, an orientation of the solar panel 12 in the X, Y and Z plane.

Because the solar panel 12 is placed over the lower housing, little or no forces are acting upon the sphere 26 and sleeve 24 at their interface. Preferably, the interface is dimensioned to present little or no friction during movement of the solar panel 12. Therefore, the only significant frictional forces to overcome during movement of the solar panel are the frictional forces presented by the engaged surfaces of pin end 28a in pin seat 30. Thus, the frictional resistance of joint 20 is relatively small in comparison to conventional joints such as a whole ball and socket joint. In that regard, it should be noted that pin end 28a and pin seat 30 could be other than generally semispherical in shape. For example, pin end 28a could be conical and present a substantially sharp point and pin seat 30 would therefore be a cooperably smaller seat presenting less friction during movement.

It should also be noted that the sleeve 24 and pin 28 of joint 20 could extend from the lower housing 14 and a sphere 26 could cooperably extend from the solar panel 12 to provide the same articulatable joint 20. However, for outdoor use, it is preferable to have the sleeve 24 extend from the solar panel and thus face downward so as to provide a better weather seal.

FIGS. 2 and 3 disclose manufacturing advantages of the structure of joint 20 as used to couple the housing 18 and the housing 14. FIG. 2 discloses that housing 18 includes an upper half 18b and a lower half 18c which are joined to house the solar array 16. As best seen in FIG. 3 (where the upper half 18b of housing 18 is not shown), sphere 26 can be dropped into a large open end 24b of sleeve 24. Once inside the sleeve 24, the sphere 26 is captured by the narrowed opening 24a of sleeve 24. This permits a ball-in-seat type configuration without the necessity of having a split sleeve or collar which has to be tightened after the admission of the ball into the sleeve. In assembling the joint 20, the pin 28 is provided with a plate 28b which has a diameter larger than the large opening 24b in sleeve 24. Thus, pin 28 may be extended into sleeve 24 after sphere 26 has been inserted and the plate 28b can be fixed to an inner surface of the housing 18 to complete the articulatable portion of joint 20.

Pedestal 26a is shown with opposed lugs 26b which cooperably mate with lug openings 34 in housing 14. Once inserted in the correct orientation, these lugs can be turned to a counter-orientation for fastening the pedestal 26 to the lower housing 14. As best disclosed in FIGS. 2 and 4, pedestal 26a is hollow which permits wires (such as wires W of FIG. 2) to extend from housing 18 to lower housing 14 through joint 20 for appropriate electrical connection between the solar panel and the lamp.

As disclosed in the drawings, solar light 10 is preferably made more spacially compact by placement of the sphere 26 into recess 36 in an upper surface of lower housing 14. Similarly, the upper surface of housing 14 is provided with contoured surfaces 38 to accommodate solar panel 12 in a skewed or angled position.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

What is claimed:

1. A solar powered outdoor recreational light comprising:
    a housing;
    a lamp operatively associated with the housing;
    a solar panel for collecting sun light and producing electricity for the lamp, the solar panel having sides and a center of gravity; and,
    a joint connected to said solar panel proximate said center of gravity and to said housing so that the solar panel may rotate relative to said housing and any side of said panel may move vertically relative to said housing.

2. The solar powered outdoor recreational light of claim 1, wherein the joint includes a pin and a pin seat interposed between the solar panel and the first housing.

3. The solared powered outdoor recreational light of claim 2, wherein the pin and pin seat are cooperable with a sphere and sphere seat.

4. The solar powered outdoor recreational light of claim 1, wherein the joint comprises:
    a sleeve having first and second ends, the sleeve being attached to the solar panel at the first end of the sleeve and including an opening in the second sleeve end;
    an elongated pin within the sleeve, the pin having one end fixed to the solar panel and one free end;
    a generally hollow sphere having an outer diameter and a sphere opening, the sphere being attached to the housing and extending into the sleeve at the opening of
    the second end of the sleeve, the pin extending into the sphere opening, the opening in the second sleeve end having a smaller inner diameter than the outer diameter of the sphere to define a sphere seat, so that the sphere is rotatable within the sleeve but cannot be withdrawn from the sleeve; and,
    a pin seat within the sphere, the free end of the pin fitting into the pin seat and being freely pivotal and rotational therein.

5. A device for coupling a first and second housing in articulatable relation, comprising:
    a cooperable sphere and sphere seat means for forming a sphere seat about the sphere interposed between the first and second housing; and,
    a cooperable pin and pin seat within the sphere and said means for forming the sphere seat, said pin and pin seat connected to opposite housings and said sphere seat and sphere connected to opposite housings, the sphere and sphere seat maintaining the pin in the pin seat and the pin and pin seat maintaining the sphere substantially in the sphere seat.

6. A device for coupling a first and second housing in articulatable relation comprising:
    a sleeve having first and second ends, the sleeve being attached to the second housing at the first end of the sleeve with an opening in the second sleeve end;
    an elongated pin within the sleeve, the pin having one end fixed with respect to the second housing and one free end;
    a generally hollow sphere having an outer diameter and an opening, the sphere being attached to the first housing and extending into the opening at the second end of the sleeve, the pin extending into the sphere opening, the opening in the second sleeve end having a smaller inner diameter than the outer diameter of the sphere defining a sphere seat, so that the sphere is rotatable within the sleeve but cannot be withdrawn from the sleeve; and,
    a pin seat within the sphere, the free end of the pin fitting into the pin seat and freely pivotal and rotational therein.

7. The device of claim 5 wherein the pin seat is supported on radially spaced ribs within the sphere.

8. The device of claim 5 further including at least three radially spaced and intersecting ribs within the sphere; and,
    a portion of each rib being recessed at the intersection of the ribs to define the pin seat.

9. The device of claim 5 wherein the pin terminating in a generally rounded end and the pin seat being generally rounded.

* * * * *

UNITED STATES PATENT AND TRADEMARK OFFICE
CERTIFICATE OF CORRECTION

PATENT NO. : 4,977,488

DATED : December 11, 1990

INVENTOR(S) : James C. Spotts and Haw R. Chai

It is certified that error appears in the above-identified patent and that said Letters Patent is hereby corrected as shown below:

Column 6, line 24, after "and", delete "sphere seat".

Signed and Sealed this

Twelfth Day of May, 1992

*Attest:*

DOUGLAS B. COMER

*Attesting Officer*     *Acting Commissioner of Patents and Trademarks*